United States Patent [19]

Moskovich

[11] Patent Number: 5,218,480
[45] Date of Patent: Jun. 8, 1993

[54] RETROFOCUS WIDE ANGLE LENS

[75] Inventor: Jacob Moskovich, Cincinnati, Ohio

[73] Assignee: U.S. Precision Lens Incorporated, Cincinnati, Ohio

[21] Appl. No.: 801,058

[22] Filed: Dec. 3, 1991

[51] Int. Cl.$^5$ .................. G02B 13/04; G02B 13/18
[52] U.S. Cl. .................. 359/753; 359/708; 359/713; 359/714; 359/749; 359/750; 359/751; 359/752
[58] Field of Search ............... 359/749–753, 359/708, 713, 714

[56] References Cited

U.S. PATENT DOCUMENTS

| | | | |
|---|---|---|---|
| 3,947,194 | 3/1976 | Ikemori | 359/663 |
| 4,025,169 | 5/1977 | Fischer et al. | 359/749 X |
| 4,189,211 | 2/1980 | Taylor | 359/663 |
| 4,425,028 | 1/1984 | Gagnon et al. | 359/246 |
| 4,461,542 | 7/1984 | Gangnon | 359/502 |
| 4,826,311 | 5/1989 | Ledebuhr | 359/663 |
| 4,913,540 | 4/1990 | Minefuji | 359/663 |

FOREIGN PATENT DOCUMENTS 0311116  4/1989  European Pat. Off.
1007068A  3/1983  U.S.S.R.

Primary Examiner—Scott J. Sugarman
Attorney, Agent, or Firm—Maurice M. Klee

[57] ABSTRACT

A wide angle lens system of the retrofocus type is provided which includes two lens units. The first lens unit is of negative power and includes a combination of a positive element having a high dispersion and a negative element having a low dispersion for correction of lateral color. The second lens unit is of positive power and includes a combination of a positive element having a low dispersion and a negative element having a high dispersion for correction of longitudinal color. The lens units satisfy the relationship that the magnitude of $f_1$ is less than about 1.15 times $f_2$ and preferably satisfy the relationship that the magnitude of $f_1$ is less than $f_0$. The first and second lens units each preferably include an aspheric surface. Applications of the lens system include rear projection television systems wherein a single lens is used to project light from three LCD light valves onto a viewing screen.

15 Claims, 6 Drawing Sheets

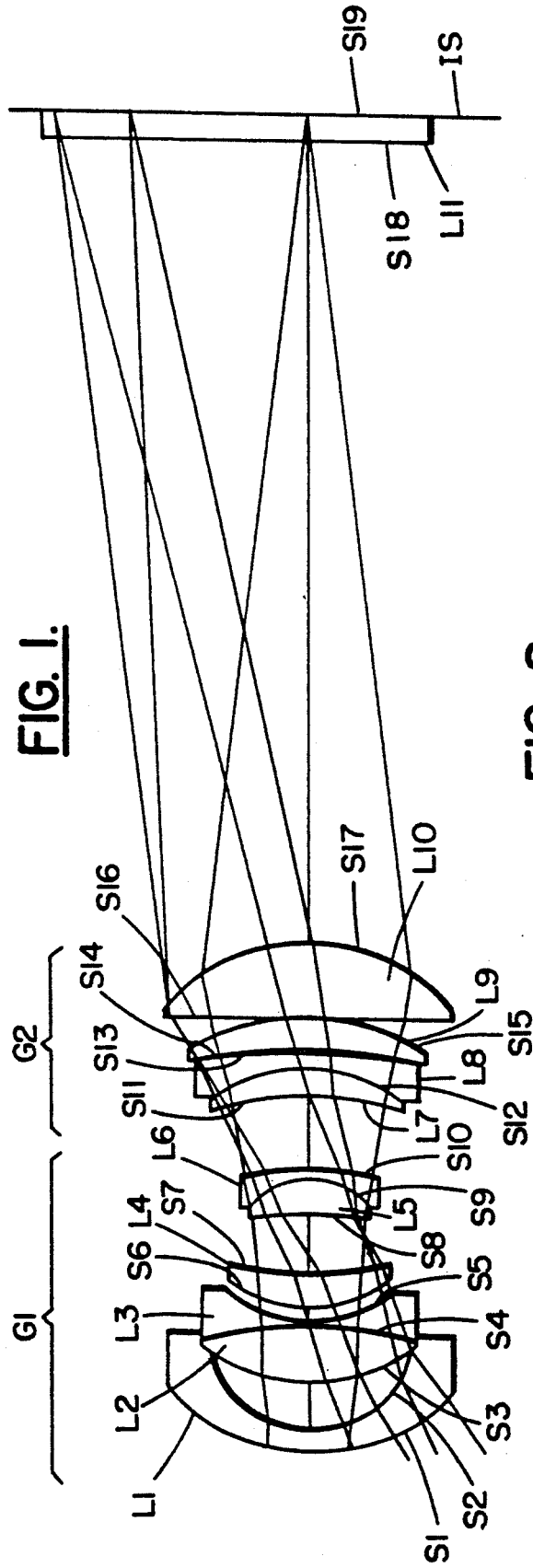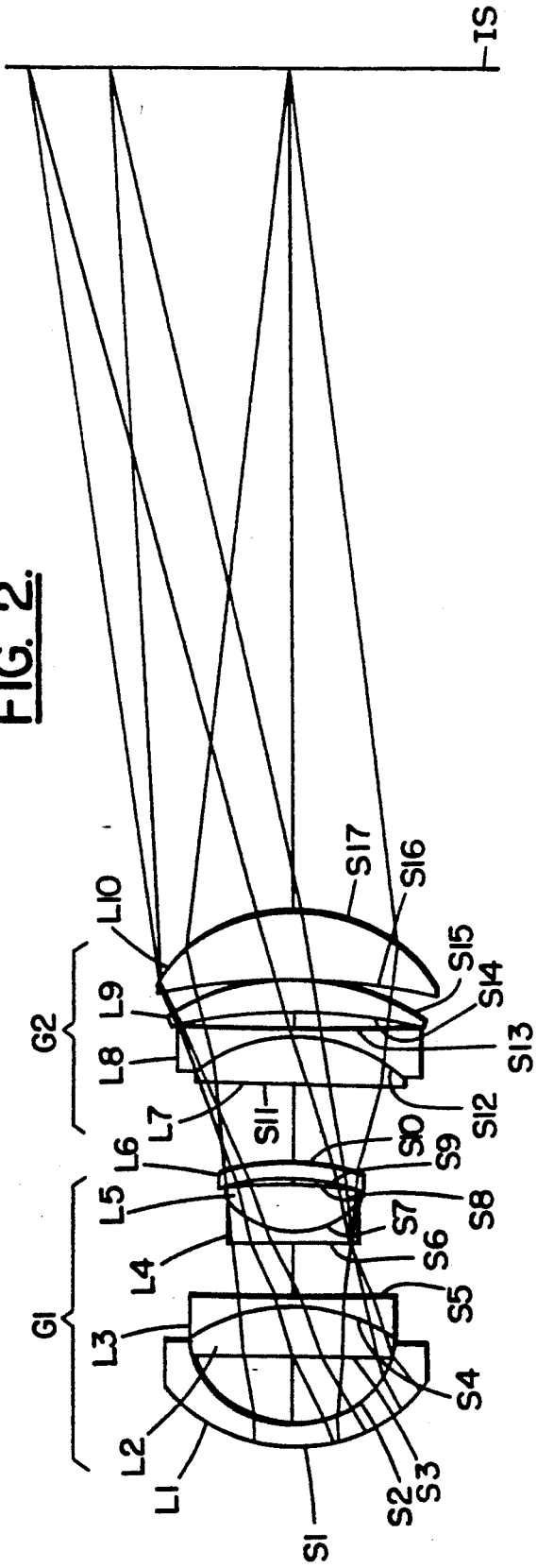

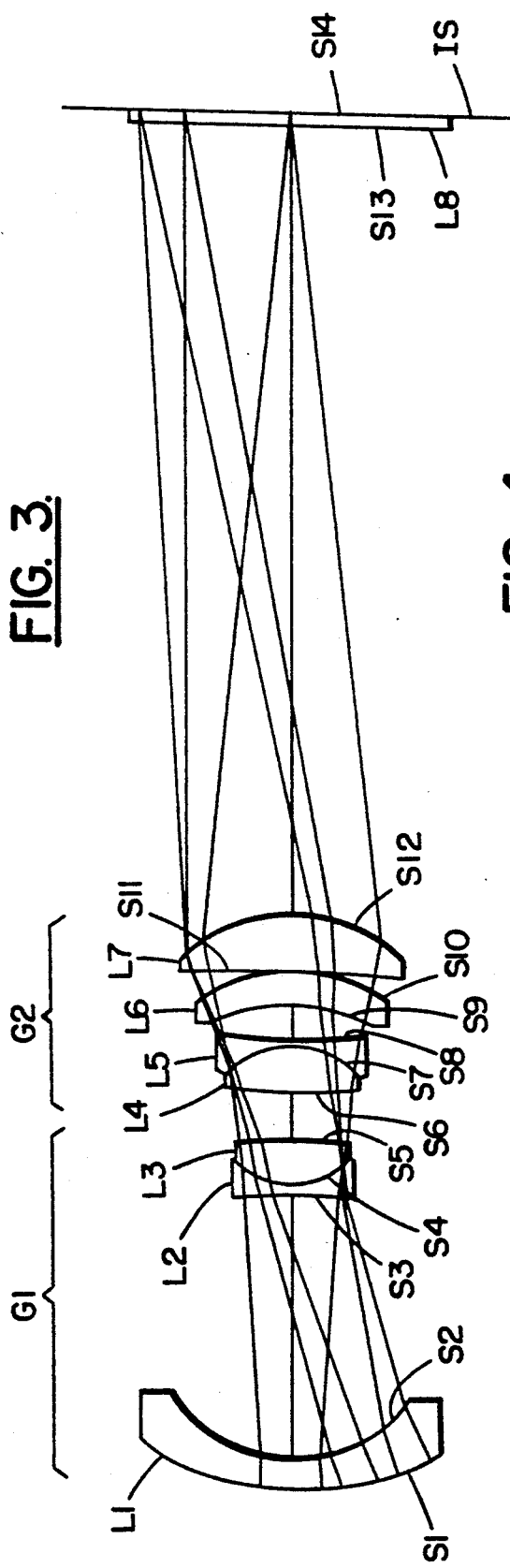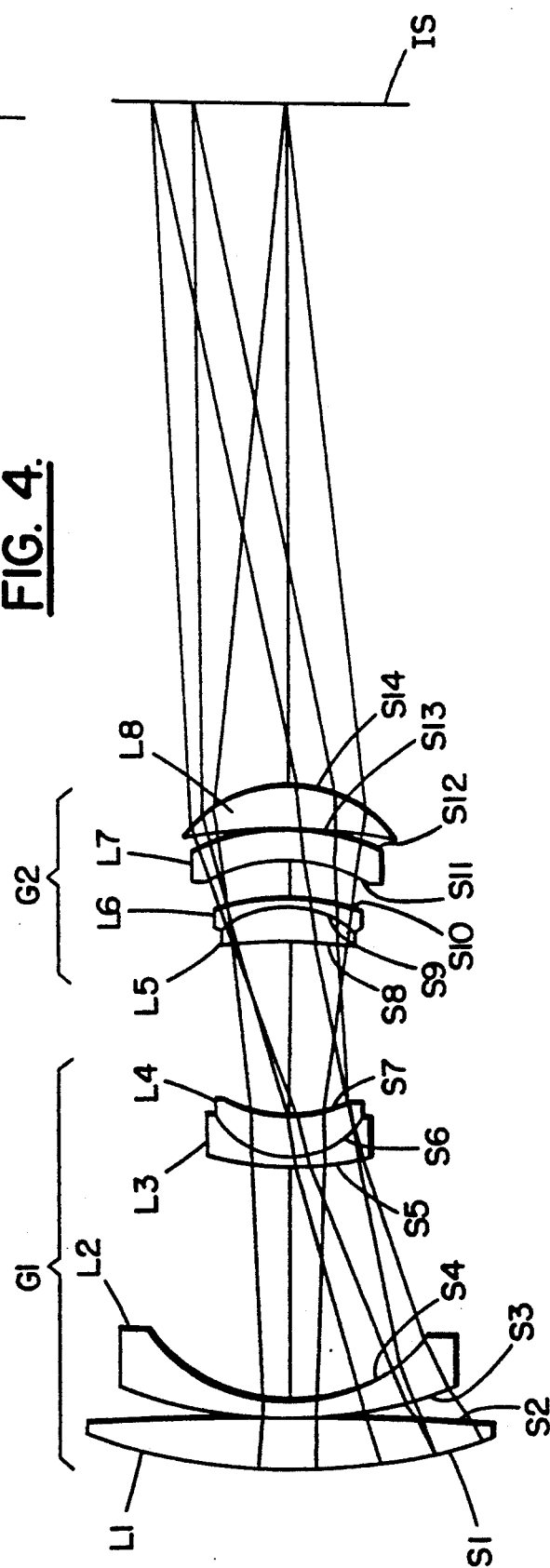

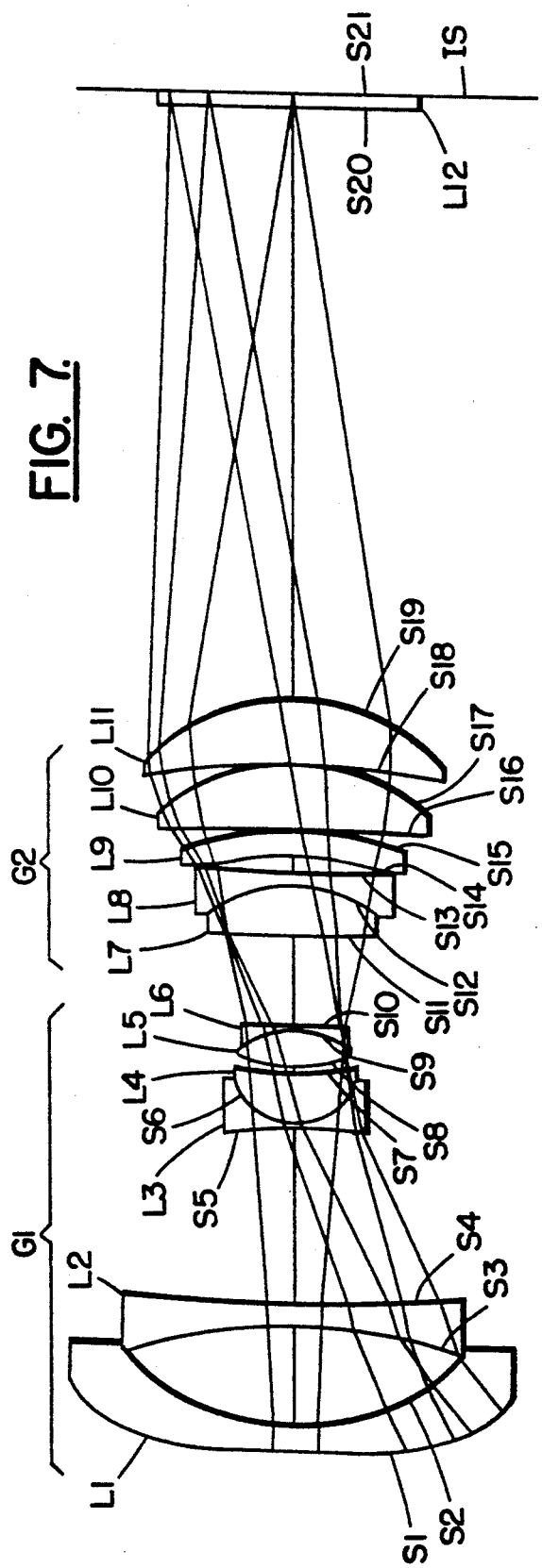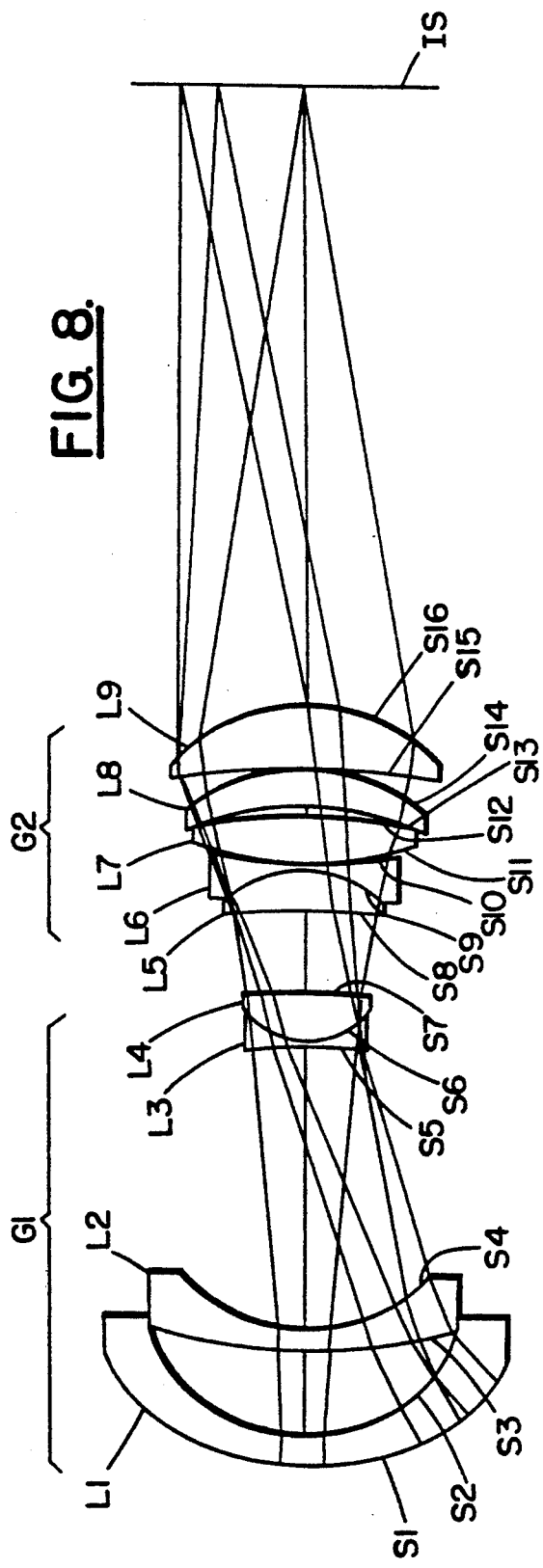

RETROFOCUS WIDE ANGLE LENS

FIELD OF THE INVENTION

This invention relates to wide angle retrofocus type lenses having a long back focal length and a relatively compact size and to the use of such lenses in liquid crystal display (LCD) light valve projection televisions.

BACKGROUND OF THE INVENTION

Most of the LCD light valve projection TV systems currently under development can be broken into two broad classes: 1) those using multiple exit pupils where a separate lens is used to project each of three different color LCDs, and 2) single exit pupil systems where all three different color LCDs are projected through the same lens.

In either case, the system can be of the transmissive type where light comes in from behind the liquid crystal panel and is modulated as it passes through the panel or of the reflective type where light enters through the front of the panel and is reflected back out towards the screen after having been modulated.

Examples of such television systems and of lenses which can be used with such systems can be found in, for example, Taylor, U.S. Pat. No. 4,189,211, Gagnon et al., U.S. Pat. No. 4,425,028, Gagnon, U.S. Pat. No. 4,461,542, Ledebuhr, U.S. Pat. No. 4,826,311, Minefuji, U.S. Pat. No. 4,913,540, EPO Patent Publication No. 311,116, and Russian Patent Publication No. 1,007,068. A lens described as being "retrotelecentric" is disclosed in Ikemori, U.S. Pat. No. 3,947,094.

Systems having a single exit pupil solve the problem of color shift in the projected image and allow for a simpler design of the projection screen in that the screen does not need to perform mixing of the colors from the three lens systems. However, the projection lens must have a large separation between the LCD panels and the lens to accommodate the filters and beamsplitters used to combine the light from the different LCDs into a common beam for projection onto the screen by the lens.

For rear projection applications, it is desirable to have as small an overall package size (set size) as possible. In terms of the optics, this means that the imaging conjugates should be made as small as possible while still maintaining a large image size. This, in turn, means that the projection lens must have a large field of view. Additionally, it is desirable to use lenses having a small physical size so as to reduce the sizes of the folding mirrors placed between the lens and the screen. Lenses having small physical sizes also help to further reduce the size of the overall TV package.

The illumination of the LCD panel plays a very important role in the performance of an LCD projection TV. In particular, it is very important to match the location and size of the exit pupil of the illumination system with the entrance pupil of the lens to obtain a bright, uniformly-illuminated TV image. Since illumination optics generally work best when the exit pupil is located a long distance from the light source, it is desirable to use a projection lens with a long entrance pupil distance.

The lens described below addresses all the above mentioned requirements and at the same time provides a high level of image quality and, in particular, a high level of correction of both lateral and longitudinal chromatic aberrations.

SUMMARY OF THE INVENTION

In view of the foregoing, it is an object of the present invention to provide a novel lens structure having: 1) a focal point a long distance from the lens (i.e., a long back focal length for light traveling from left to right in the figures), 2) a pupil a long distance from the lens (i.e., an exit pupil a long distance from the lens for light traveling from left to right in the figures), 3) a wide field of view (i.e., a field of view greater than about 25 degrees half or semi-field for light traveling from left to right in the figures), 4) small lens elements, and 5) a high level of image quality.

It is a further objection of the invention to provide a LCD projection television system having an improved lens system which provides a high level of image quality and an overall small set size.

To achieve the foregoing and other objects, the invention provides a wide angle lens system of the retrofocus type comprising:
 (a) a first lens unit of negative power comprising:
  (i) a negative element; and
  (ii) a combination of two elements, one of the two elements being a positive element having a high dispersion and the other of the two elements being a negative element having a low dispersion; and
 (b) a second lens unit of positive power comprising:
  (i) a positive element; and
  (ii) a combination of two elements, one of the two elements being a positive element having a low dispersion and the other of the two elements being a negative element having a high dispersion.

The elements making up the first and second units are chosen so that the absolute value of the focal length of the first lens unit $f_1$ is less than about 1.15 times the focal length of the second lens unit $f_2$. In certain preferred embodiments of the invention, the absolute value of $f_1$ is smaller than the overall focal length $f_0$ of the lens. To provide a high level of image quality, in addition to the high and low dispersion elements which provide for color correction, either or preferably both of the first and second lens units includes at least one aspheric surface.

When used in a LCD projection television, the lens is arranged with the second lens unit nearer to the LCD panels. For this application, the lens' aperture stop is located between the first and second lens units at a point which is at or inside of the second unit's front focal point so that the image of the aperture stop formed by the second lens unit (the entrance pupil as seen from the LCD) is located a long distance from the LCD panel.

The accompanying drawings, which are incorporated in and constitute part of the specification, illustrate preferred embodiments of the invention, and together with the description, serve to explain the principles of the invention. It is to be understood, of course, that both the drawings and the description are explanatory only and are not restrictive of the invention.

BRIEF DESCRIPTION OF THE DRAWINGS

FIGS. 1 through 8 are schematic side views of lens systems constructed in accordance with the invention.

DESCRIPTION OF THE PREFERRED EMBODIMENTS

Figure 5:
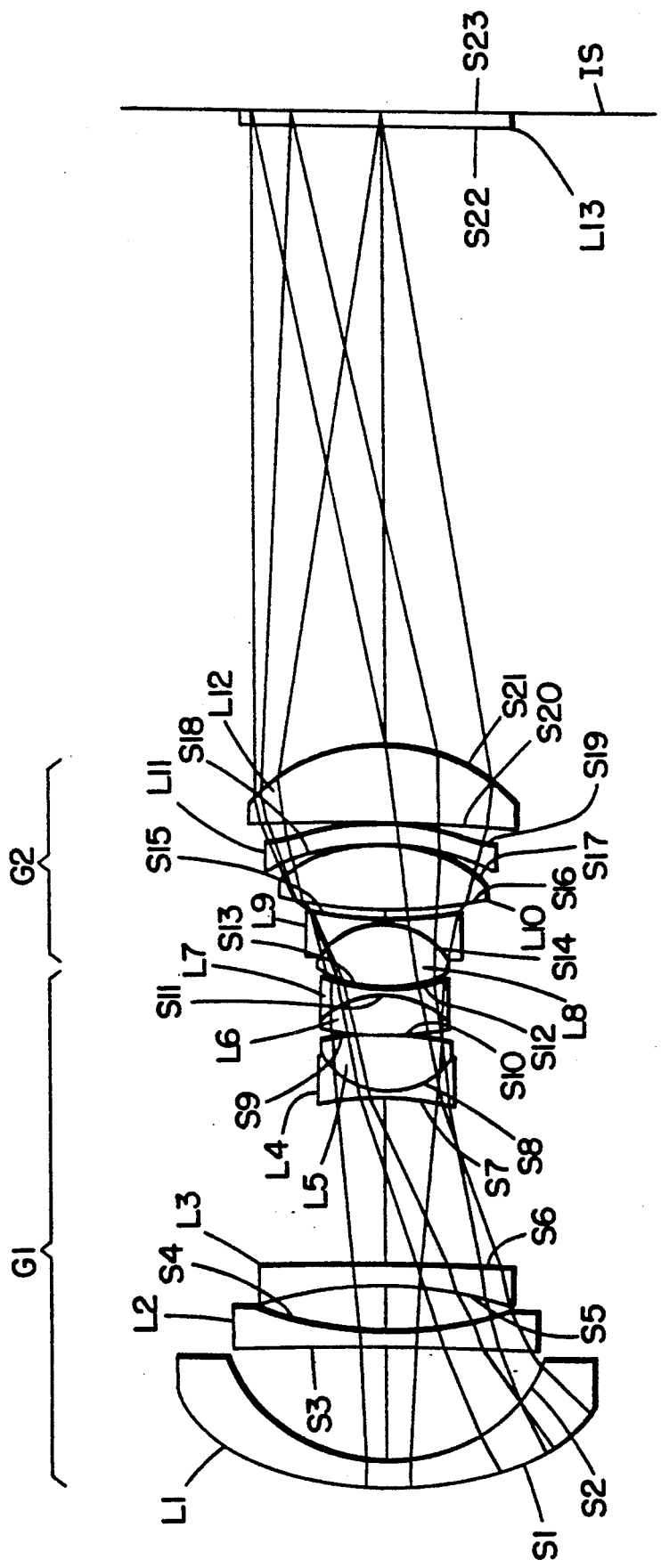
Figure 6:
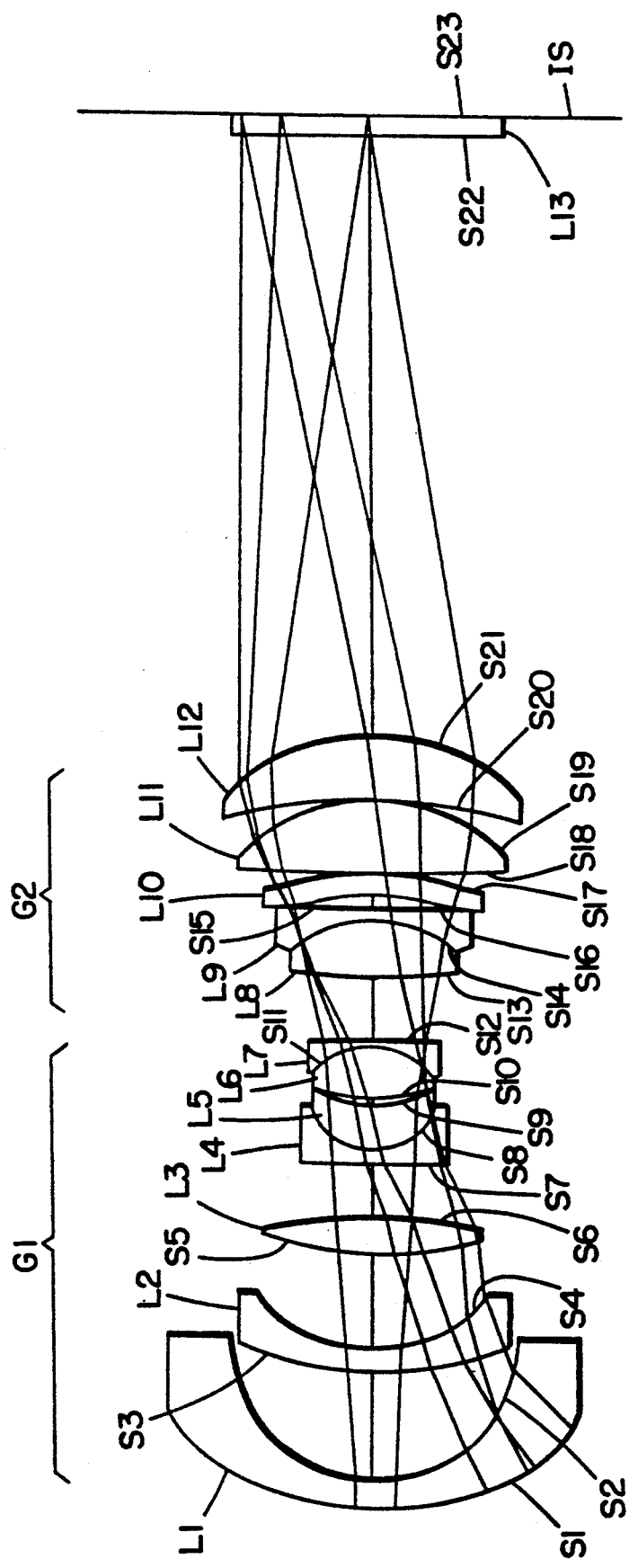

As discussed above, the present invention relates to lens systems having two lens units separated by an air space wherein the first lens unit has a negative power and the second lens unit has a positive power and each unit includes a combination of two elements of low and high dispersion to provide overall good color correction for the lens.

The first unit comprises at least one negative element, preferably a single negative meniscus element, and at least one combination of positive and negative elements having high and low dispersion properties described by a small and a large V-value, respectively. As used herein, high dispersion optical materials are those having V-values ranging from 20 to 50 for an index of refraction in the range from 1.85 to 1.5, respectively, while low dispersion materials are those having V-values ranging from 35 to 75 for the same range of indices of refraction. At least one of the surfaces in the first unit may be aspherical.

The second unit comprises at least one positive element and a combination of positive and negative elements having dispersion characteristics described by a large and a small V-value, respectively. The second unit may also contain at least one aspherical surface.

The aperture stop of the lens is preferably positioned between the first and second units. When the lens is designed for use only at its wide open, maximum aperture, the aperture stop may be inside one of the elements in the vicinity of the airspace between the two units.

When the lens is used with a LCD panel, the aperture stop preferably lies inside the second unit's front focal point to assure that a virtual image of the stop, which comprises the entrance pupil of the lens as seen from the LCD panel, is at a considerable distance away from the panel. With reference to the figures, the second unit's front focal point in question is that lying to the left of the second unit, i.e., towards the first unit. When the position of the aperture stop is coincident with the front focal point of the second unit, the entrance pupil of the lens as seen from the LCD panel is imaged at infinity.

To provide a long distance between the second lens unit and the lens' right focal point, i.e., a long back focal length for light traveling from left to right in the figures, and to maintain a compact size of the lens, the first unit should be quite strong. In particular, the magnitude of $f_1$ should be less than about 1.15 times $f_2$. For many applications, the magnitude of $f_1$ is preferably less than the focal length of the whole lens $f_0$.

A strong negative power for he first unit causes a relatively large contribution to distortion which may be corrected by the use of an aspherical surface as a part of that unit. Additionally, contributions to the correction of coma and astigmatism may also be obtained from the use of such an asphere.

When the field of view of the lens becomes large, e.g., a semi-field angle of about 35°, additional aspherical surfaces may be used in the first unit to obtain better control of off-axis aberrations.

With regard to chromatic aberrations, the combination of a positive element having a small V-value and a negative element having a large V-value in the first unit allows for good correction of lateral color and chromatic variation of distortion.

The second unit will typically have a focal length similar to the focal length of the lens as a whole. To provide correction for spherical aberration of the lens, the second unit preferably includes one or more aspherical surfaces. These one or more aspherical surfaces can also be used to achieve a high level of correction of spherical aberration of the entrance pupil of the lens as seen from a LCD display. Correcting this aberration is important in order to provide a good match between the entrance pupil of the lens and the exit pupil of the illumination system to assure that all the light from the illumination system will go through the projection lens.

With regard to chromatic aberrations, the combination of positive and negative elements with large and small V-values, respectively, in the second unit allows for the correction of axial (longitudinal) color to be achieved.

FIGS. 1 to 8 illustrate various lens systems constructed in accordance with the invention. Corresponding lens prescriptions appear in Tables 1 to 8, respectively. A summary of various properties of these systems appears in Tables 9 and 10. In these figures and tables, the letter "L" is used to designate individual lenses, the letter "S" to designate lens surfaces, the letters "IS" to designate the image surface, and the letter "G" to designate lens units or groups. The lens surfaces within the two lens units is summarized in Table 11.

The $N_e$ and $V_e$ values given in Tables 1–8 represent the indices of refraction and Abbe values for the various lenses at a wavelength of 0.5461 microns. The aspheric coefficients set forth in the tables are for use in the following equation:

$$z = \frac{cy^2}{1 + [1 - (1 + k)c^2y^2]^{\frac{1}{2}}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which for the lenses of Tables 1–8 is zero.

In FIGS. 1–8, light is assumed to propagate from left to right, i.e., from the system's long conjugate towards its short conjugate. In the case of a projection television using a liquid crystal display, light will propagate in the opposite direction, i.e., from right to left. That is, for such systems, the LCD will be located to the right of the second lens unit and the viewing screen will be located to the left of the first lens unit. In FIGS. 1, 3, and 5–7 an LCD-type display is schematically illustrated by the planar block to the right of G2.

As can be seen from Table 9, the magnitude of $f_1$ is less than about 1.15 times $f_2$ for all the examples, the magnitude of $f_1$ is less than $f_0$ for Examples 1 and 3–7, and $f_2$ is similar to $f_0$ for all of the examples and is within 20% of $f_0$ for Examples 1–4. As also shown in this table, all of the examples have a half field of view above 25°, i.e., all of the lenses are wide angle lenses.

Figure 9:
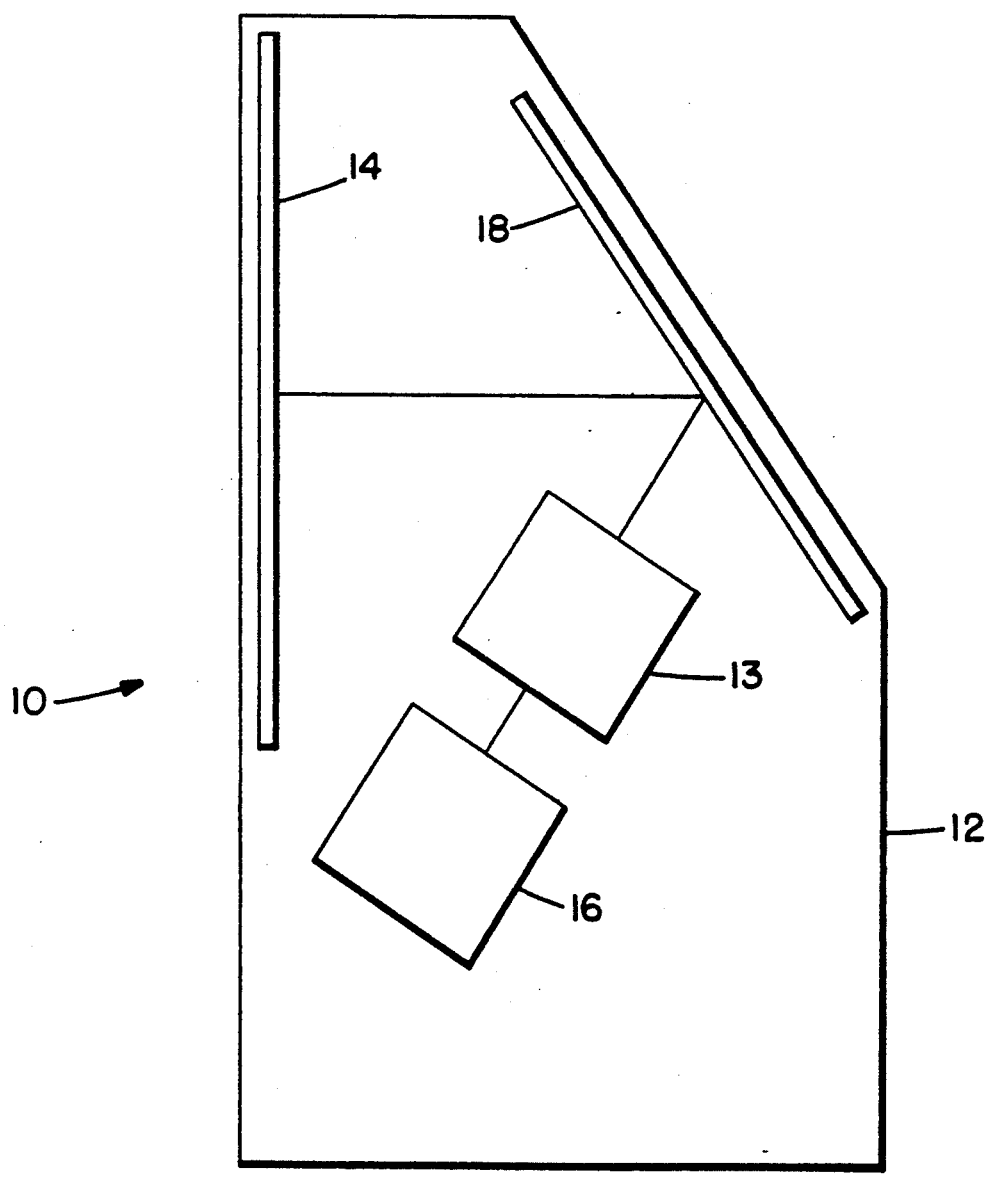
FIG. 9 is a schematic diagram of a LCD light valve projection TV employing a lens system constructed in accordance with the invention.

FIG. 9 is a schematic diagram of a LCD light valve projection television 10 constructed in accordance with the invention. As shown in this figure, projection television 10 includes cabinet 12 having projection screen 14 along its front face. The image to be projected is formed by module 16 which includes a light source, three LCD panels, and a set of dichroic beamsplitters for combining the light from the three panels into a single beam. Various commercially available components known in the art can be used to construct module 16.

The single, three-color beam produced by module 16 is projected by lens 13 onto mirror 18 and ultimately to screen 14. Lens 13 is constructed in accordance with the present invention and thus forms a high quality image on the screen while at the same time allowing cabinet 12 to have an overall small size.

Although specific embodiments of the invention have been described and illustrated, it is to be understood that a variety of modifications which do not depart from the scope and spirit of the invention will be evident to persons of ordinary skill in the art from the foregoing disclosure. The following claims are intended to cover the specific embodiments set forth herein as well as such modifications, variations, and equivalents.

TABLE 1

| LENS | | SURFACE RADIUS (mm) | AXIAL DISTANCE BETWEEN SURFACES (mm) | Ne | Ve |
|---|---|---|---|---|---|
| L1 | S1 | 106.0349 | | | |
|    |    |          | 5.0000 | 1.49378 | 56.95 |
|    | S2 | 34.6801  | | | |
|    |    |          | 16.7055 | | |
| L2 | S3 | 65.9226  | | | |
|    |    |          | 15.3782 | 1.62408 | 36.05 |
|    | S4 | −162.4377 | | | |
| L3 |    |          | 3.0000 | 1.74435 | 52.43 |
|    | S5 | 47.3852  | | | |
|    |    |          | 2.9332 | | |
|    | S6 | 38.7648  | | | |
| L4 |    |          | 11.0000 | 1.49378 | 56.95 |
|    | S7 | 108.0509 | | | |
|    |    |          | 19.2033 | | |
|    | S8 | −135.8052 | | | |
| L5 |    |          | 12.0000 | 1.65222 | 33.60 |
|    | S9 | −22.9143 | | | |
| L6 |    |          | 2.0000 | 1.81080 | 40.40 |
|    | S10 | −85.7226 | | | |
|    |    |          | 22.8029 | | |
| L7 | S11 | −124.4576 | | | |
|    |    |          | 9.0000 | 1.51872 | 64.02 |
|    | S12 | −54.4326 | | | |
| L8 |    |          | 4.0000 | 1.81264 | 25.27 |
|    | S13 | −491.9398 | | | |
|    |    |          | 1.7144 | | |
|    | S14 | −214.1831 | | | |
| L9 |    |          | 10.0152 | 1.49378 | 56.95 |
|    | S15 | −63.8143 | | | |
|    |    |          | .2000 | | |
|    | S16 | −1344.1290 | | | |
| L10 |   |          | 23.0473 | 1.59142 | 61.03 |
|    | S17 | −60.7625 | | | |
|    |    |          | 250.0000 | | |
|    | S18 | ∞ | | | |
| L11 |   |          | 7.5000 | 1.52458 | 59.20 |
|    | S19 | ∞ | | | |
|    |    |          | .0087 | | |

ASPHERICAL SURFACE DATA:

| S | D | E | F | G | H | I |
|---|---|---|---|---|---|---|
| S1 | .14966E−05 | −.12247E−09 | −.34536E−13 | .16546E−15 | −.87797E−19 | .18616E−22 |
| S6 | −.75901E−08 | −.61143E−09 | .60280E−11 | .39748E−15 | −.11120E−16 | .13167E−19 |
| S15 | .54967E−06 | .16532E−09 | .13261E−12 | −.19777E−16 | .88289E−20 | −.22085E−23 |

TABLE 2

| LENS | | SURFACE RADIUS (mm) | AXIAL DISTANCE BETWEEN SURFACES (mm) | Ne | Ve |
|---|---|---|---|---|---|
| L1 | S1 | 72.6598 | | | |
|    |    |          | 5.0000 | 1.49378 | 56.95 |
|    | S2 | 32.9936 | | | |
|    |    |          | 20.2616 | | |
| L2 | S3 | 431.1641 | | | |
|    |    |          | 15.0000 | 1.62408 | 36.05 |
|    | S4 | −64.8330 | | | |
| L3 |    |          | 3.0000 | 1.74435 | 52.43 |
|    | S5 | 886.8083 | | | |
|    |    |          | 15.7010 | | |
|    | S6 | 333.5692 | | | |
| L4 |    |          | 3.0000 | 1.83930 | 37.05 |
|    | S7 | 26.6827 | | | |
| L5 |    |          | 14.0000 | 1.67765 | 31.94 |
|    | S8 | −156.6556 | | | |
|    |    |          | 1.1643 | | |
|    | S9 | −115.3066 | | | |

TABLE 2-continued

| LENS | S | SURFACE RADIUS (mm) | AXIAL DISTANCE BETWEEN SURFACES (mm) | Ne | Ve |
|---|---|---|---|---|---|
| L6 | | | 4.0000 | 1.49354 | 57.34 |
| | S10 | −126.3225 | | | |
| | | | 26.9338 | | |
| | S11 | −629.7960 | | | |
| L7 | | | 12.0000 | 1.51872 | 64.02 |
| | S12 | −61.1854 | | | |
| L8 | | | 4.0000 | 1.74706 | 27.56 |
| | S13 | ∞ | | | |
| | | | 3.7387 | | |
| | S14 | −191.8310 | | | |
| L9 | | | 10.0000 | 1.49378 | 56.95 |
| | S15 | −68.2860 | | | |
| | | | .2000 | | |
| | S16 | −188.4562 | | | |
| L10 | | | 20.0000 | 1.51872 | 64.02 |
| | S17 | −54.0627 | | | |
| | | | 250.0632 | | |

ASPHERICAL SURFACE DATA:

| S | D | E | F | G | H | I |
|---|---|---|---|---|---|---|
| S1 | .11495E-05 | .80396E-10 | .15864E-12 | .66273E-16 | −.94058E-19 | .50338E-22 |
| S10 | −.80611E-06 | −.22254E-08 | −.12837E-11 | .35390E-14 | .79124E-17 | −.32865E-19 |
| S15 | .58121E-06 | .21925E-09 | −.21401E-14 | −.36387E-16 | .37385E-19 | −.10942E-22 |

TABLE 3

| LENS | S | SURFACE RADIUS (mm) | AXIAL DISTANCE BETWEEN SURFACES (mm) | Ne | Ve |
|---|---|---|---|---|---|
| | S1 | 112.8827 | | | |
| L1 | | | 8.0000 | 1.49354 | 57.34 |
| | S2 | 47.0795 | | | |
| | | | 80.18 | | |
| | S3 | −83.8357 | | | |
| L2 | | | 3.0000 | 1.79014 | 43.71 |
| | S4 | 27.1015 | | | |
| L3 | | | 12.0000 | 1.79192 | 25.50 |
| | S5 | −160.8239 | | | |
| | | | 15.6911 | | |
| | S6 | 376.5779 | | | |
| L4 | | | 13.0000 | 1.51872 | 64.02 |
| | S7 | −29.5420 | | | |
| L5 | | | 3.0000 | 1.81264 | 25.27 |
| | S8 | −282.5645 | | | |
| | | | 9.9778 | | |
| | S9 | −80.4535 | | | |
| L6 | | | 9.0000 | 1.49354 | 57.34 |
| | S10 | −54.6521 | | | |
| | | | 1.0000 | | |
| | S11 | −360.6606 | | | |
| L7 | | | 17.0000 | 1.51872 | 64.02 |
| | S12 | −46.7772 | | | |
| | | | 235.65 | | |
| | S13 | ∞ | | | |
| L8 | | | 2.5000 | 1.52458 | 59.20 |
| | S14 | ∞ | | | |

ASPHERICAL SURFACE DATA:

| S | D | E | F | G | H | I |
|---|---|---|---|---|---|---|
| S1 | .50592E-06 | .16167E-10 | −.28644E-13 | .36220E-16 | −.12681E-19 | .17418E-23 |
| S9 | −.18003E-05 | .51642E-09 | −.27362E-11 | .62083E-15 | .30851E-17 | −.30618E-20 |

TABLE 4

| LENS | S | SURFACE RADIUS (mm) | AXIAL DISTANCE BETWEEN SURFACES (mm) | Ne | Ve |
|---|---|---|---|---|---|
| | S1 | 232.5495 | | | |
| L1 | | | 15.0000 | 1.48951 | 49.93 |
| | S2 | −2439.0800 | | | |
| | | | .0000 | | |
| | S3 | 146.7255 | | | |
| L2 | | | 5.5000 | 1.71615 | 53.68 |
| | S4 | 61.2762 | | | |
| | | | 80.1134 | | |
| | S5 | 118.8177 | | | |
| L3 | | | 3.0000 | 1.71615 | 53.68 |
| | S6 | 28.3211 | | | |
| L4 | | | 15.0000 | 1.72733 | 29.16 |

TABLE 4-continued

| LENS | S | SURFACE RADIUS (mm) | AXIAL DISTANCE BETWEEN SURFACES (mm) | Ne | Ve |
|---|---|---|---|---|---|
| | S7 | 56.1212 | | | |
| | | | 60.1199 | | |
| | S8 | −449.4696 | | | |
| L5 | | | 12.0000 | 1.51872 | 64.02 |
| | S9 | −37.7949 | | | |
| L6 | | | 3.0000 | 1.81264 | 25.27 |
| | S10 | −80.3022 | | | |
| | | | 13.3733 | | |
| | S11 | −64.1311 | | | |
| L7 | | | 10.0000 | 1.49354 | 57.34 |
| | S12 | −71.9387 | | | |
| | | | 1.0000 | | |
| | S13 | −250.9194 | | | |
| L8 | | | 12.0000 | 1.51872 | 64.02 |
| | S14 | −51.3697 | | | |
| | | | 231.5135 | | |

ASPHERICAL SURFACE DATA:

| S | D | E | F | G | H | I |
|---|---|---|---|---|---|---|
| S11 | −.11683E-05 | −.34876E-09 | −.68143E-13 | −.68563E-15 | .62876E-18 | −.33575E-21 |

TABLE 5

| LENS | S | SURFACE RADIUS (mm) | AXIAL DISTANCE BETWEEN SURFACES (mm) | Ne | Ve |
|---|---|---|---|---|---|
| | S1 | 166.7893 | | | |
| L1 | | | 7.0000 | 1.49354 | 57.34 |
| | S2 | 53.7244 | | | |
| | | | 29.0554 | | |
| | S3 | −2413.0950 | | | |
| L2 | | | 6.0000 | 1.49354 | 57.34 |
| | S4 | 77.5337 | | | |
| | | | 12.1062 | | |
| | S5 | −439.4338 | | | |
| L3 | | | 5.0000 | 1.49354 | 57.34 |
| | S6 | −470.1938 | | | |
| | | | 47.7318 | | |
| | S7 | −119.3178 | | | |
| L4 | | | 2.0000 | 1.74690 | 49.00 |
| | S8 | 21.7550 | | | |
| L5 | | | 14.5000 | 1.81264 | 25.27 |
| | S9 | −151.4782 | | | |
| | | | 1.0000 | | |
| | S10 | 128.5317 | | | |
| L6 | | | 11.0000 | 1.57829 | 41.25 |
| | S11 | −26.9117 | | | |
| L7 | | | 2.0000 | 1.83930 | 37.05 |
| | S12 | 49.7160 | | | |
| | | | .5087 | | |
| | S13 | 43.9925 | | | |
| L8 | | | 16.1897 | 1.51978 | 51.91 |
| | S14 | −24.1324 | | | |
| L9 | | | 2.0000 | 1.81264 | 25.27 |
| | S15 | 214.6256 | | | |
| | | | 2.6536 | | |
| | S16 | 149.7545 | | | |
| L10 | | | 18.5051 | 1.51872 | 64.02 |
| | S17 | −44.8523 | | | |
| | | | .2000 | | |
| | S18 | −63.4312 | | | |
| L11 | | | 5.0000 | 1.49354 | 57.34 |
| | S19 | −57.8218 | | | |
| | | | .2000 | | |
| | S20 | −571.4227 | | | |
| L12 | | | 22.1721 | 1.51872 | 64.02 |
| | S21 | −48.3718 | | | |
| | | | 170.0000 | | |
| | S22 | ∞ | | | |
| L13 | | | 3.5000 | 1.51872 | 64.02 |
| | S23 | ∞ | | | |
| | | | .0010 | | |

ASPHERICAL SURFACE DATA:

| S | D | E | F | G | H | I |
|---|---|---|---|---|---|---|
| S1 | .81353E-06 | .26733E-10 | −.12926E-12 | .80374E-16 | −.21787E-19 | .28735E-23 |
| S4 | −.14186E-05 | −.24254E-08 | .20304E-11 | −.20978E-14 | .27671E-17 | −.11348E-20 |
| S5 | −.22382E-05 | −.26539E-08 | .34725E-11 | −.28534E-15 | −.86110E-18 | .20518E-21 |
| S19 | .16311E-05 | .76203E-09 | .58142E-12 | .12553E.15 | −.20767E-18 | .45314E-22 |

TABLE 6

| LENS | | SURFACE RADIUS (mm) | AXIAL DISTANCE BETWEEN SURFACES (mm) | Ne | Ve |
|---|---|---|---|---|---|
| L1 | S1 | 122.2828 | | | |
| | | | 7.0000 | 1.49354 | 57.34 |
| | S2 | 42.2151 | | | |
| | | | 30.8830 | | |
| L2 | S3 | 111.8497 | | | |
| | | | 6.0000 | 1.49354 | 57.34 |
| | S4 | 46.1144 | | | |
| | | | 27.3549 | | |
| L3 | S5 | 245.3543 | | | |
| | | | 10.0000 | 1.49354 | 57.34 |
| | S6 | −148.5418 | | | |
| | | | 16.0000 | | |
| L4 | S7 | −336.6699 | | | |
| | | | 2.5000 | 1.81080 | 40.40 |
| | S8 | 18.6212 | | | |
| L5 | | | 15.0000 | 1.81264 | 25.27 |
| | S9 | 62.8765 | | | |
| | | | 1.0000 | | |
| L6 | S10 | 70.1130 | | | |
| | | | 14.0000 | 1.57829 | 41.25 |
| | S11 | −23.7888 | | | |
| L7 | | | 2.0000 | 1.81080 | 40.40 |
| | S12 | −206.8242 | | | |
| | | | 18.7122 | | |
| L8 | S13 | 490.3304 | | | |
| | | | 15.0000 | 1.51872 | 64.02 |
| | S14 | −39.3481 | | | |
| L9 | | | 3.5000 | 1.81264 | 25.27 |
| | S15 | −1039.8430 | | | |
| | | | 4.2183 | | |
| L10 | S16 | −118.0000 | | | |
| | | | 7.0000 | 1.49354 | 57.34 |
| | S17 | −63.3925 | | | |
| | | | .2000 | | |
| L11 | S18 | −1029.7890 | | | |
| | | | 18.9556 | 1.51872 | 64.02 |
| | S19 | −57.1428 | | | |
| | | | .0000 | | |
| L12 | S20 | −177.7165 | | | |
| | | | 18.1470 | 1.51872 | 64.02 |
| | S21 | −61.2271 | | | |
| | | | 170.0000 | | |
| L13 | S22 | ∞ | | | |
| | | | 3.5000 | 1.51872 | 64.02 |
| | S23 | ∞ | | | |
| | | | −.0229 | | |

| ASPHERICAL SURFACE DATA: | | | | | | |
|---|---|---|---|---|---|---|
| S | D | E | F | G | H | I |
| S1 | .78755E-06 | .18026E-11 | −.13107E-12 | .81066E-16 | −.19327E-19 | .18622E-23 |
| S4 | .19799E-06 | −.54141E-09 | .25665E-12 | .17650E-15 | .10338E-18 | −.30784E-21 |
| S5 | .12025E-05 | .71844E-09 | .51745E-12 | .39564E-15 | .21664E-18 | −.30784E-21 |
| S17 | .16304E-05 | .42299E-09 | .60173E-12 | −.26955E-15 | −.13124E-18 | .82540E-22 |

TABLE 7

| LENS | | SURFACE RADIUS (mm) | AXIAL DISTANCE BETWEEN SURFACES (mm) | Ne | Ve |
|---|---|---|---|---|---|
| L1 | S1 | −562.9973 | | | |
| | | | 7.0000 | 1.49354 | 57.34 |
| | S2 | 69.7026 | | | |
| | | | 29.2336 | | |
| L2 | S3 | −171.8047 | | | |
| | | | 6.0000 | 1.49354 | 57.34 |
| | S4 | −472.6218 | | | |
| | | | 51.1723 | | |
| L3 | S5 | −179.9509 | | | |
| | | | 2.5000 | 1.81080 | 40.40 |
| | S6 | 19.7244 | | | |
| L4 | | | 15.0000 | 1.81264 | 25.27 |
| | S7 | 202.5100 | | | |
| | | | 1.0000 | | |
| L5 | S8 | 92.9324 | | | |
| | | | 9.0000 | 1.57829 | 41.25 |
| | S9 | −28.8010 | | | |
| L6 | | | 2.0000 | 1.81080 | 40.40 |

TABLE 7-continued

| LENS | | SURFACE RADIUS (mm) | AXIAL DISTANCE BETWEEN SURFACES (mm) | Ne | Ve |
|---|---|---|---|---|---|
| | S10 | −3595.3950 | | | |
| | | | 25.4503 | | |
| | S11 | 241.4227 | | | |
| L7 | | | 15.0000 | 1.51872 | 64.02 |
| | S12 | −41.4693 | | | |
| L8 | | | 3.5000 | 1.81264 | 25.27 |
| | S13 | −1732.9750 | | | |
| | | | 4.0150 | | |
| | S14 | −118.0000 | | | |
| L9 | | | 7.0000 | 1.49354 | 57.34 |
| | S15 | −75.5824 | | | |
| | | | .2000 | | |
| | S16 | 2060.4940 | | | |
| L10 | | | 18.9540 | 1.51872 | 64.02 |
| | S17 | −63.8123 | | | |
| | | | .0000 | | |
| | S18 | −215.5601 | | | |
| L11 | | | 18.1276 | 1.51872 | 64.02 |
| | S19 | −62.7541 | | | |
| | | | 170.0000 | | |
| | S20 | ∞ | | | |
| L12 | | | 3.5000 | 1.51872 | 64.02 |
| | S21 | ∞ | | | |
| | | | .0012 | | |

ASPHERICAL SURFACE DATA:

| S | D | E | F | G | H | I |
|---|---|---|---|---|---|---|
| S1 | .14354E-05 | −.79148E-10 | −.13743E-12 | .82937E-16 | −.19166E-19 | .17419E-23 |
| S4 | .13853E-05 | −.32699E-09 | .31083E-13 | .96594E-17 | −.34114E-20 | −.12423E-23 |
| S15 | .15628E-05 | .46105E-09 | .28789E-12 | −.22082E-15 | .37941E-19 | −.65996E-24 |

TABLE 8

| LENS | | SURFACE RADIUS (mm) | AXIAL DISTANCE BETWEEN SURFACES (mm) | Ne | Ve |
|---|---|---|---|---|---|
| | S1 | 93.1619 | | | |
| L1 | | | 7.0000 | 1.49354 | 57.34 |
| | S2 | 46.6574 | | | |
| | | | 24.3937 | | |
| | S3 | 158.9949 | | | |
| L2 | | | 6.0000 | 1.64128 | 55.19 |
| | S4 | 53.0765 | | | |
| | | | 78.0459 | | |
| | S5 | −155.9050 | | | |
| L3 | | | 2.2182 | 1.83930 | 37.05 |
| | S6 | 22.2678 | | | |
| L4 | | | 12.0000 | 1.81264 | 25.27 |
| | S7 | −219.5400 | | | |
| | | | 23.8650 | | |
| | S8 | −260.1993 | | | |
| L5 | | | 11.0000 | 1.51872 | 64.02 |
| | S9 | −33.9132 | | | |
| L6 | | | 2.6619 | 1.81264 | 25.27 |
| | S10 | 372.8117 | | | |
| | | | .2000 | | |
| | S11 | 110.0612 | | | |
| L7 | | | 12.0000 | 1.49354 | 57.34 |
| | S12 | −89.6261 | | | |
| | | | 2.8000 | | |
| | S13 | −80.3868 | | | |
| L8 | | | 10.0000 | 1.51872 | 64.02 |
| | S14 | −52.1945 | | | |
| | | | .0000 | | |
| | S15 | −257.6454 | | | |
| L9 | | | 17.0000 | 1.51872 | 64.02 |
| | S16 | −50.7737 | | | |
| | | | 170.0131 | | |

ASPHERICAL SURFACE DATA:

| S | D | E | F | G | H | I |
|---|---|---|---|---|---|---|
| S1 | .48361E-07 | .62870E-09 | −.27386E-12 | .50310E-16 | .73191E-22 | −.91572E-25 |
| S12 | .31608E-05 | −.18013E-08 | .71687E-11 | −.10824E-13 | .77148E-17 | −.21739E-20 |

TABLE 9

| Example | $f_0$ | f | $f_2$ | $1.15 \cdot f_2$ | Mag. | ½ Field of View | f/No.* |
|---|---|---|---|---|---|---|---|
| 1 | 108.60 | −99.34 | 109.51 | 125.94 | −.8604E-01 | 37.0° | 3.68 |
| 2 | 108.24 | −121.06 | 120.55 | 138.63 | −.8604E-01 | 36.3° | 3.68 |
| 3 | 91.52 | −87.11 | 105.18 | 120.96 | −.4744E-01 | 28.0° | 4.30 |
| 4 | 89.97 | −83.72 | 107.12 | 123.19 | −.3000E-01 | 28.0° | 4.37 |
| 5 | 41.06 | −17.03 | 55.11 | 63.38 | −.4673E-01 | 41.6° | 2.87 |
| 6 | 40.50 | −32.05 | 73.88 | 84.96 | −.4673E-01 | 42.0° | 2.87 |
| 7 | 40.51 | −33.35 | 76.65 | 88.15 | −.4673E-01 | 42.0° | 2.87 |
| 8 | 41.21 | −51.57 | 85.07 | 97.83 | −.4673E-01 | 41.7° | 2.87 |

*For object at infinity.

TABLE 10

| Example | Aperture Stop[1] | Left Focal Point of Second Unit[2] | Exit Pupil[3] | Back Focal Distance[4] | $f_0$ |
|---|---|---|---|---|---|
| 1 | 1.00 | −68.10 | −386.7 | 245.5 | 108.60 |
| 2 | 1.87 | −77.50 | −392.8 | 240.8 | 108.24 |
| 3 | 11.78 | −55.79 | −327.3 | 232.9 | 91.52 |
| 4 | 45.12 | −64.40 | −350.3 | 228.8 | 89.97 |
| 5 | 21.45 | −16.60 | −226.0 | 170.4 | 41.06 |
| 6 | 23.10 | −29.40 | −256.8 | 170.4 | 40.50 |
| 7 | 22.80 | −33.00 | −288.6 | 170.4 | 40.51 |
| 8 | 17.12 | −41.24 | −280.0 | 168.1 | 41.21 |

[1]Distance from last surface of the first lens unit.
[2]Distance from the first surface of the second lens unit for light traveling from left to right in the figures.
[3]Distance from image surface for light traveling from left to right in the figures.
[4]Distance from last optical surface of the second lens unit to the image point for an object at infinity for light traveling from left to right in the figures.

TABLE 11

| Example | G1 | G2 |
|---|---|---|
| 1 | S1-S10 | S11-S17 |
| 2 | S1-S10 | S11-S17 |
| 3 | S1-S5 | S6-S12 |
| 4 | S1-S7 | S8-S14 |
| 5 | S1-S12 | S13-S21 |
| 6 | S1-S12 | S13-S21 |
| 7 | S1-S10 | S11-S19 |
| 8 | S1-S7 | S8-S16 |

What is claimed is:

1. A wide angle lens system of the retrofocus type having a focal length $f_0$ which comprises:
   (a) a first lens unit of negative power having a focal length $f_1$ and comprising a negative element and a combination of two elements, one of said two elements being a positive element having a high dispersion and the other of said two elements being a negative element having a low dispersion; and
   (b) a second lens unit of positive power having a focal length $f_2$ and comprising a positive element and a combination of two elements, one of said two elements being a positive element having a low dispersion and the other of said two elements being a negative element having a high dispersion; wherein each of the first and the second lens units includes an aspheric surface and the system includes an aperture stop between the first and second lens units.

2. A wide angle lens system of the retrofocus type having a focal length $f_0$ which comprises:
   (a) a first lens unit of negative power having a focal length $f_1$ and comprising a negative element and a combination of two elements, one of said two elements being a positive element having a high dispersion and the other of said two elements being a negative element having a low dispersion; and
   (b) a second lens unit of positive power having a focal length $f_2$ and comprising a positive element and a combination of two elements, one of said two elements being a positive element having a low dispersion and the other of said two elements being a negative element having a high dispersion;
   wherein the absolute value of $f_1$ is less than about 1.15 times $f_2$ and the system includes an aperture stop between the first and second lens units.

3. The wide angle lens system of claim 2 wherein the absolute value of $f_1$ is smaller than $f_0$.

4. The wide angle lens system of claim 1, 2, or 3 wherein the second unit's focal point in the direction of the first lens unit and the aperture stop are arranged so that the aperture stop is located inside of the focal point.

5. The wide angle lens system of claim 4 wherein the aperture stop is located at the focal point.

6. The wide angle lens system of claim 1, 2 or 3 wherein the negative element of the first lens unit is a negative meniscus lens.

7. The wide angle lens system of claim 1, 2 or 3 wherein the lens system has a half angle field of view in the direction of the first lens unit of at least about 25° degrees.

8. The wide angle lens system of claim 2 or 3 wherein the first lens unit includes an aspherical surface.

9. The wide angle lens system of claim 2 or 3 wherein the second lens unit includes an aspherical surface.

10. A projection television system comprising three LCD light valves, a screen, and a wide angle lens system which projects light from each of the LCD light valves onto the screen, said wide angle lens system comprising:
   (a) a first lens unit of negative power having a focal length $f_1$ and comprising a negative element and a combination of two elements, one of said two elements being a positive element having a high dispersion and the other of said two elements being a negative element having a low dispersion; and
   (b) a second lens unit of positive power having a focal length $f_2$ and comprising a positive element and a combination of two elements, one of said two elements being a positive element having a low dispersion and the other of said two elements being a negative element having a high dispersion.

11. The projection television system of claim 10 wherein each of the first and the second lens units includes an aspheric surface.

12. The projection television system of claim 10 wherein the absolute value of $f_1$ is less than about 1.15 times $f_2$.

13. The projection television system of claim 10 wherein the absolute value of $f_1$ is smaller than $f_0$.

14. The projection television system of claim 10, 11, 12, or 13 wherein the wide angle lens system has an entrance pupil located at a substantial optical distance from the LCD light valves.

15. The projection television system of claim 14 wherein the wide angle lens system includes an aperture stop and wherein the second unit's focal point in the direction of the first lens unit and the aperture stop are arranged so that the aperture stop is located at or inside of the focal point.

* * * * *